United States Patent [19]

Evans et al.

[11] 4,347,435

[45] Aug. 31, 1982

[54] READOUT MECHANISM FOR FUEL PUMP COUNTER

[75] Inventors: Alfred C. Evans, Simsbury; Bruno S. Smilgys, Hartford, both of Conn.

[73] Assignee: Veeder Industries, Inc., Hartford, Conn.

[21] Appl. No.: 228,320

[22] Filed: Jan. 26, 1981

[51] Int. Cl.$^3$ ........................ B67D 5/22; G01D 13/22

[52] U.S. Cl. ................................ 235/94 R; 116/302; 222/29

[58] Field of Search .............. 235/94 R, 94 A, 117 R, 235/117 A, 118, 91 R; 116/302, 306, 307, 309, 327, 331, 332; 222/23, 29

[56] References Cited

U.S. PATENT DOCUMENTS 2,765,764 10/1956 Beldt .............................. 116/302 X 3,886,890 6/1975 Gibson et al. .................. 116/302 X

*Primary Examiner*—Donald A. Griffin

*Assistant Examiner*—Thomas H. Tarcza

*Attorney, Agent, or Firm*—Prutzman, Kalb, Chilton & Alix

[57] ABSTRACT

A readout pointer for the penny wheel of a fuel pump cost counter having a circumferentially extending mask for the penny wheel and adapted to be mounted in alternate axially spaced positions for selectively masking the short graduations on the penny wheel for selectively reading the penny wheel either to the nearest 1¢ graduations or nearest 2¢ graduations.

8 Claims, 2 Drawing Figures

READOUT MECHANISM FOR FUEL PUMP COUNTER

DESCRIPTION

TECHNICAL FIELD

The present invention relates generally to mechanical fuel pump registers employed in fuel dispensing apparatus for registering the cost and volume amounts of fuel dispensed, for example as shown and described in U.S. Pat. No. 2,932,448 of H. N. Bliss, dated Apr. 12, 1960, and entitled "Resetting Mechanism for Counters", and relates more particularly to a new and improved counter readout mechanism for reading the right-hand wheel of a counter, notably a cost counter, of a fuel pump register.

In the operation of mechanical fuel pump registers, it is essential that the cost counter reading meet the accuracy requirements of the applicable weights and measures regulations. Thus, it is essential that the cost counter reading precisely agrees mathematically, within the cost readout accuracy provided, with the product of the volume reading and the posted unit volume price. To date, precise mathematical agreement to the nearest 1¢ has been achieved even at the present high price of fuel of up to $2.00 per gallon or more. That is because the volume reading is normally sufficiently precise for the cost counter reading to be in mathematical agreement with the volume reading to the nearest 1¢ cost graduation typically provided on a ten cent or single transfer right-hand cost counter wheel. However, as the unit volume price of fuel increases, normal volume reading imprecision can produce apparent mathematical disagreement between the volume and cost readings.

Also, because of the increasing unit volume price of fuel and resulting increasing rate of rotation of the cost counter for any given volume rate of fuel delivered, the conventional ten-cent or single transfer right-hand cost counter wheel is being replaced by a multiple transfer wheel (e.g. a twenty cent or two transfer wheel) to reduce its rate of rotation, required drive torque and rate of wear. As a result, the 1¢ wheel graduations are closer together by a factor of two or more (e.g. by a factor of two in a two transfer wheel) and the potential cost reading imprecision is increased by the same factor.

Partly because of the foregoing problems, the weights and measures regulations regarding cost readout accuracy have been changed to permit the cost counter readout accuracy to be increased to the nearest 2¢ increment at a unit volume price above $1 and to the nearest 5¢ increment at a unit volume price above $3.00. However, the regulations continue to require that the cost reading be mathematically correct to the nearest cost graduation provided on the right-hand or lowest order cost counter wheel. Accordingly, it is expected it will eventually be necessary to revise the lowest order counter wheel to employ 2¢ minimum readout graduations and thereafter 5¢ minimum readout graduations as the unit volume price of gasoline escalates to higher levels.

DISCLOSURE OF INVENTION

In accordance with the present invention, a new and improved cost counter readout mechanism is provided which enables the fuel pump cost counter to be modified to continue to comply with the cost readout accuracy regulations as the unit volume price of fuel increases.

It is a principal aim of the present invention to provide a new and improved readout pointer mechanism useful with fuel pump cost counters of conventional design which permits the cost counter readout to be revised within the permissible scope of the applicable regulations by a simple modification which can be performed in the field.

It is another aim of the present invention to provide a new and improved counter readout mechanism for reading a counter wheel to the nearest wheel graduation and which permits the readout to be readily modified, for example from reading a counter wheel to the nearest 1¢ graduation to the nearest 2¢ graduation and/or from the nearest 2¢ graduation to the nearest 5¢ graduation without substantial modification of the fuel pump register.

It is a further aim of the present invention to provide a new and improved counter readout mechanism having a readout pointer wich may be selectively positioned for reading the lowest order cost counter wheel of a fuel pump cost counter to either the nearest 1¢ or nearest 2¢ wheel graduation. In accordance with the present invention, it is also contemplated that the pointer may be selectively positioned for reading the lowest order counter wheel to either the nearest 1¢, 2¢ or 5¢ wheel graduation.

It is another aim of the present invention to provide a new and improved fuel pump counter readout mechanism which provides for modification of a fuel pump counter readout in the field at a very low cost and with minimum equipment down time.

Other objects will be in part obvious and in part pointed out more in detail hereinafter.

A better understanding of the invention will be obtained from the following detailed description and the accompanying drawing of an illustrative application of the invention.

BEST MODE FOR CARRYING OUT THE INVENTION

Figure 1:
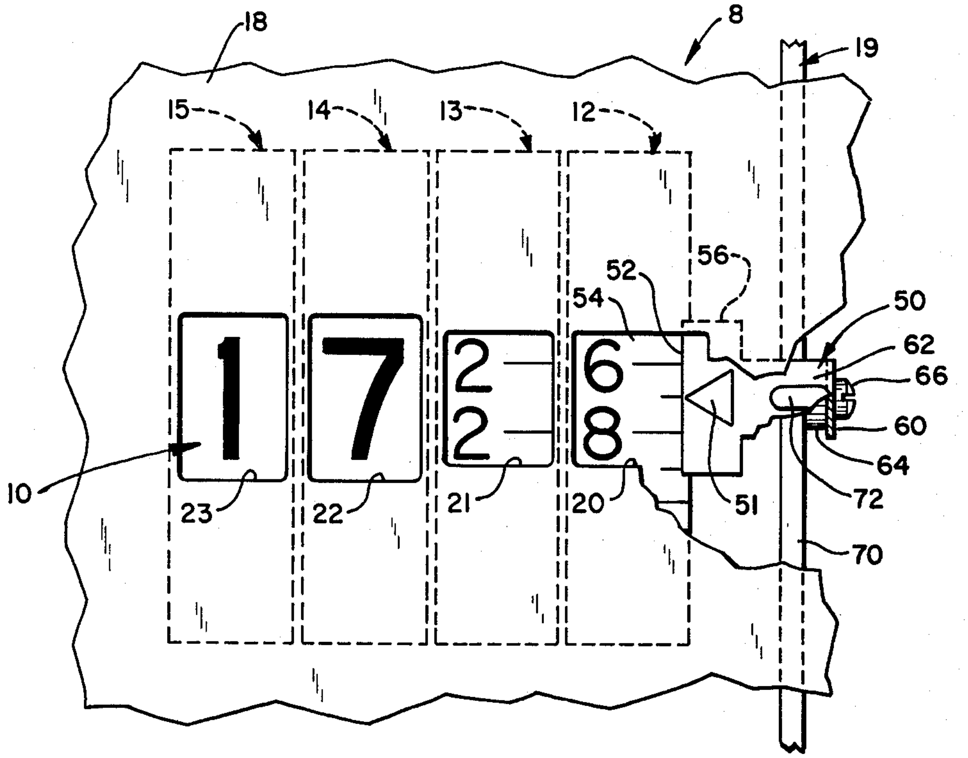
FIG. 1 is a partial front elevation view, partly broken away and partly in section, of a fuel pump register incorporating an embodiment of a counter readout mechanism of the present invention and showing a readout pointer thereof in a first operational position.

Referring now to the drawing in detail, wherein like numerals represent like parts thoughout, there is shown a fuel pump register 8 having a cost counter 10 incorporating an embodiment of the present invention. The cost counter 10 may be identical to the cost counter disclosed in the aforementioned U.S. Pat. No. 2,932,448 excepting for the modifications provided by the present invention hereinafter described. In a conventional manner, the cost counter 10 comprises four coaxial counter wheels 12–15 of increasing order of significance. Also, in a conventional manner, the cost counter is driven for registering the cost amount of fuel delivered by associated fuel dispensing apparatus (not shown) in accordance with the volume amount of fuel delivered and the unit volume price established by a conventional mechanical price variator (not shown) employed in the cost counter drive train. The price variator may for example be an extended range variator capable of establishing a unit volume price up to $2.99 9/10 or more and for example be of the type disclosed in U.S. Pat. No. 4,136,573 of B. S. Smilgys et al, dated Jan. 30, 1979 and entitled "Extended Range Fuel Pump Computer Price Variator".

The disclosed four wheel cost counter 10 is capable of registering the cost amount of fuel to over $99. The right-hand or lowest order counter wheel 12 serves as a units or penny wheel, the second or next higher order counter wheel 13 serves as a tens or ten cent wheel and the third and forth order counter wheels 14, 15 serve to register the dollars amount of fuel delivered from $00 to $99. The right-hand wheel 12 may be a conventional ten cent or single transfer wheel which is rotated one revolution for each ten cents of fuel delivered. However, as shown, the penny wheel 12 is preferably a forty cent or four transfer wheel which is rotated one revolution for each forty cents of fuel delivered. In that event, the tens wheel 13 is indexed one count or 10¢ for each 90° of rotation of the right-hand wheel 12 and therefore four counts or 40¢ for each revolution of the right-hand wheel 12.

The penny wheel 12 is shown marked only with alternating relatively long 2¢ increment graduations and relatively short remaining 1¢ increment graduations and with only the relatively long 2¢ increment graduations successively identified with "0", "2", "4", "6" and "8" indicia. Alternatively, the 5¢ increment graduations could be identified with "0" and "5" indicia and be made even longer to provide three different length axially extending graduations.

In a generally conventional way the right-hand wheel is connected to transfer a tens count to the tens wheel 13 at the end of each 10¢ count of the units wheel 12 and with the count transfer being effected as the units wheel 12 rotates 36° from its "6" position to its "0" position. Also, to facilitate cost readability during transfers, the tens wheel 13 employs a 0-9 numeral sequence with successive repeating smaller than normal numerals having the same height as the penny wheel indicia (and which is slightly more than one-half the height of the relatively large but standard size numerals used on the dollar wheels 14, 15).

A register cover plate 18 mounted on a register frame 19 has four separate windows 20-23 for the four cost counter wheels 12-15 respectively, for reading the front approximately 36° of each dollar wheel 14, 15 and for reading the front approximately 18°-20° of the penny wheel 12 and ten cent wheel 13.

In accordance with the present invention, a two-position readout pointer 50 having an indicator 51 is provided for reading the right-hand counter wheel 12. In its 1¢ increment readout position shown in FIG. 1, the pointer 50 is mounted so that its inner or left-hand edge 52 is approximately aligned with the right-hand edge of the penny wheel rim 54 and therefore so that each relatively short 1¢ increment graduation as well as each alternate relatively long 2¢ increment graduation on the penny wheel rim 54 can be viewed for reading the penny wheel 12 to the nearest 1¢ increment with the indicator 51. In its second or alternative 2¢ increment readout position shown in FIG. 2, the pointer is mounted so that the circumferentially extending mask 56 of the pointer 50 overlaps the right-hand edge portion of the penny wheel rim 54 to completely cover or mask the alternate relatively short 1¢ increment graduations which otherwise are viewable from the front of the counter through the penny wheel window 20. For that purpose, the mask 56 has a part cylindrical shape which extends the full height of the penny window 20 just outwardly of the wheel rim 54 and inwardly of the penny window 20. Accordingly, with the pointer 50 in its 2¢ increment readout position, the relatively long 2¢ increment graduations are the only graduations visible for reading the penny wheel 12 and therefore the penny wheel is only readable to the nearest 2¢. In both axial positions of the pointer 50, the pointer 50 is angularly adjustable a few degrees through the provision of an elongated mounting slot (not shown) in a pointer mounting flange 60. Thus in either axial position, the pointer can be set exactly on "0" with the cost counter wheels 12-15 in their "0" positions where they are reset between fuel deliveries.

Figure 2:
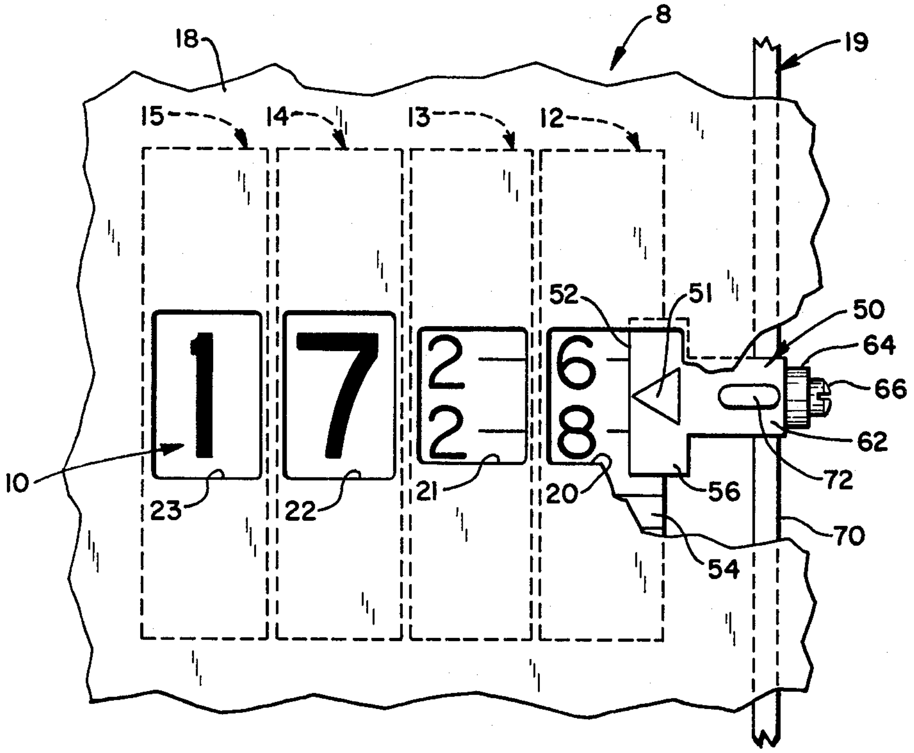
FIG. 2 is an enlarged partial front elevation view, partly broken away, of the fuel pump register showing the readout pointer in a second operational position.

The pointer 50 has an elongated axially extending shank 62 interconnecting its mask 56 and its mounting flange 60 and so that the pointer 50 may be axially positioned either as shown in FIG. 1 or as shown in FIG. 2 by placing a spacer bushing 64 either on the inside or outside of its mounting flange 60. A suitable screw fastener 66 is employed for securing the pointer 50 to a side plate 70 of the register frame 19 in both instances, and the pointer 50 can be repositioned to its other operating position merely by removing and then reinstalling the screw fastener 66 with the spacer bushing 64 positioned on the opposite side of the mounting flange 60. Also, an outer axially extending boss 72 is provided on the elongated shank 62 to overly the front edge of the register side plate 70 in both axial positions of the pointer 50. The boss 72 serves as a wedge under the cover plate 18 and side plate 70 to prevent the cover plate from being installed so as to hold the pointer mask 56 in engagement with the wheel rim 54 of the penny wheel 12.

It can be seen that the pointer 50 provides for reading the right-hand or penny wheel to the nearest 1¢ when the pointer is in its position shown in FIG. 1 and for reading the right-hand wheel to the nearest 2¢ when the pointer is in its alternate position shown in FIG. 2. Thus, the pointer 50 can be positioned as necessary to provide a readout accuracy to within either the nearest 1¢ or nearest 2¢ in accordance with the accuracy available at the established unit volume price. Also, the pointer 50 can be used for reading the cost to the nearest 1¢ until the price escalates to where that level of accuracy is no longer desired. Thereupon, the pointer 50 can be easily repositioned in the field to provide for reading the cost to the nearest 2¢ and within the degree of accuracy required by the weights and measures regulations.

In the shown embodiment, the 1¢ and 2¢ graduations are provided as axially extending black lines on a white rim background and the mask 56 is provided as an integral part of the pointer 50 to selectively cover or mask the short 1¢ increment graduations. As an alternative approach, the short 1¢ increment graduations could be provided as narrow slits (not shown) in a white rim and a background mask (not shown) could be mounted inside the wheel rim to selectively provide either a black background for reading the short 1¢ increment graduation slits or a white background for masking the readability of the graduation slits. The background mask could be angularly adjustable within the wheel rim or be axially adjustable (and also affixed to the pointer if desired) to provide for selectively reading and background masking the short 1¢ increment graduation slits. Other alternative approaches include (a) selectively employing a masking tape on the wheel rim 54 for selectively masking the short 1¢ increment graduations, and (b) using colored (e.g. yellow) 1¢ increment graduation lines and selectively employing a similarly colored transparent mask in the penny wheel window 20 to selectively mask out those graduations.

As will be apparent to persons skilled in the art, various modifications, adaptations and variations of the foregoing specific disclosure can be made without departing from the teachings of the present invention.

We claim:

1. In a fuel pump cost counter for registering the accumulated cost count of fuel delivered and having a plurality of cost counter wheels coaxially mounted in ascending order of significance from right to left as the counter is read from the front thereof, the first order cost counter wheel having an outer indicia rim with an annular arrangement of a plurality of angularly spaced axially extending and axially overlapping cost count increment graduations representing larger and smaller cost count increments respectively, the first larger cost count increment graduations axially extending to the left of the remaining cost count increment graduations as the counter is read from the said front thereof, and a read mechanism comprising a graduation indicator and mounting means for mounting the graduation indicator adjacent to said indicia rim for reading from the said front of the counter the accumulated cost count of the first order counter wheel with its axially extending graduations, the improvement wherein the read mechanism comprises mask means having a first selective operative position masking from the said front of the counter the said remaining cost count increment graduations only, and wherein the read mechanism mounting means is operable for selectively mounting the mask means in its said first operative position for reading with the graduation indicator and from the said front of the counter, the accumulated cost count of the first order counter wheel with the said first cost count increment graduations and without the said remaining cost count increment graduations.

2. In a counter for registering an accumulated count readable from the front thereof and having a first order counter wheel with an outer generally cylindrical indicia rim with an annular arrangement of a plurality of angularly spaced axially extending and axially overlapping count increment graduations providing first and second different sets of graduations representing relatively larger and smaller count increments respectively, the first larger count increment graduations axially extending to the left of the remaining count increment graduations as the counter is read from the said front thereof, and a read mechanism comprising a graduation indicator and mounting means for mounting the graduation indicator adjacent to said indicia rim for reading the accumulated count of the first order counter wheel from the said front of the counter with the axially extending graduations, the improvement wherein the read mechanism comprises mask means having a first selective operative position masking from the said front of the counter the said remaining count increment graduations only, and wherein the read mechanism mounting means is operable for selectively mounting the mask means in its said first operative position for selectively reading the accumulated count of the first order counter wheel from the said front of the counter with either both of said sets of graduations or only with the said first count increment graduations and without the said remaining count increment graduations.

3. A counter according to claim 1 or 2 wherein the counter has a front cover plate with a viewing window for each counter wheel for reading the accumulated count thereof from the said front of the counter and wherein the mask means in its said first operative position is mounted between the indicia rim of the first order counter wheel and its viewing window to mask the said remaining count increment graduations from the respective viewing window.

4. A counter according to claim 1 or 2 wherein the mask means and graduation indicator are provided by a single part and wherein the mounting means provides for selectively mounting said part in first and second axially spaced positions thereof relative to the first order counter wheel indicia rim for selectively masking and unmasking the said remaining graduations respectively from the said front of the counter.

5. A counter according to claim 3 wherein the mask means extends the full height of the respective viewing window.

6. A counter according to claim 4 wherein the counter has a side frame at the right of the first order counter wheel as the counter is viewed from the said front thereof and wherein the said part has a flange at the right end thereof as it is viewed from the said front of the counter for selectively mounting the said part on the outside of said side frame in its said first and second axially spaced positions.

7. A counter according to claim 3 wherein the mask means has an integral boss engageable with said cover plate to prevent deflection of the mask means by the cover plate into engagement with said wheel rim when in its said first operative position.

8. A counter according to claim 6 wherein the mounting means comprises a separate spacer adapted to be mounted on opposite sides of the said flange for mounting the part in its said first and second axially spaced positions.

* * * * *